US012164270B2

(12) United States Patent
Zhou et al.

(10) Patent No.: US 12,164,270 B2
(45) Date of Patent: Dec. 10, 2024

(54) PROCESS OPTIMIZATION WITH JOINT-LEVEL INFLOW MODEL

(71) Applicant: International Business Machines Corporation, Armonk, NY (US)

(72) Inventors: Nianjun Zhou, Chappaqua, NY (US); Dharmashankar Subramanian, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 17/505,343

(22) Filed: Oct. 19, 2021

(65) Prior Publication Data

US 2023/0119440 A1  Apr. 20, 2023

(51) Int. Cl.
*G05B 13/04*  (2006.01)
*G05B 19/418*  (2006.01)
*G05B 23/02*  (2006.01)

(52) U.S. Cl.
CPC ..... *G05B 13/041* (2013.01); *G05B 19/41835* (2013.01); *G05B 23/0254* (2013.01)

(58) Field of Classification Search
CPC ............ G05B 13/041; G05B 19/41835; G05B 23/0254
See application file for complete search history.

(56) References Cited

U.S. PATENT DOCUMENTS 4,117,343 A   9/1978 Hoffeins
4,211,089 A   7/1980 Mueller et al.
(Continued)

FOREIGN PATENT DOCUMENTS

CN   1339659    3/2002
CN   102360181  2/2012
CN   104598720  5/2015

OTHER PUBLICATIONS

Subramanian et al., "A Prediction-Optimization Framework for Site-wide Process Optimization," 2019 IEEE International Congress on Internet of Things (ICIOT), 8 pages. (Year: 2019).*

(Continued)

*Primary Examiner* — Kenneth M Lo
*Assistant Examiner* — Jonathan Michael Skrzycki
(74) *Attorney, Agent, or Firm* — Amin, Turocy & Watson, LLP

(57) ABSTRACT

One or more systems, computer-implemented methods and/or computer program products to facilitate a process to monitor and/or facilitate a modification to a manufacturing process. A system can comprise a memory that stores computer executable components and a processor that executes the computer executable components stored in the memory. The computer executable components can comprise an initialization component that identifies values of inflow data of one or more inflows of a set of inflows to a manufacturing process as control variables, and a computation optimization component that optimizes one or more intermediate flows, outflows or flow qualities of the manufacturing process using, for mode-specific regression models, decision variables that are based on a set of joint-levels of the control variables. An operation mode determination component can determine operation modes of the manufacturing process that are together defined by a set of joint-levels of the control variables.

19 Claims, 11 Drawing Sheets

(56) References Cited

U.S. PATENT DOCUMENTS

| | | | |
|---|---|---|---|
| 6,038,540 A * | 3/2000 | Krist | G06Q 10/06375 |
| | | | 705/7.29 |
| 6,075,569 A | 6/2000 | Lee et al. | |
| 6,378,066 B1 | 4/2002 | Lewis | |
| 6,490,572 B2 | 12/2002 | Akkiraju et al. | |
| 6,546,724 B2 | 4/2003 | Nishimura et al. | |
| 6,609,036 B1 | 8/2003 | Bickford | |
| 6,731,994 B2 | 5/2004 | Heching et al. | |
| 7,802,618 B2 | 9/2010 | Simon et al. | |
| 8,832,673 B2 | 9/2014 | Liu et al. | |
| 9,946,972 B2 | 4/2018 | Marecek | |
| 2004/0260421 A1 * | 12/2004 | Persson | G05B 13/048 |
| | | | 162/263 |
| 2005/0075738 A1 * | 4/2005 | Attarwala | G05B 13/048 |
| | | | 700/28 |
| 2007/0265713 A1 * | 11/2007 | Veillette | G05B 23/0245 |
| | | | 700/30 |
| 2011/0087476 A1 * | 4/2011 | Calvert | E21B 43/00 |
| | | | 703/10 |
| 2011/0178833 A1 | 7/2011 | Chowdhary et al. | |
| 2012/0250517 A1 | 10/2012 | Saarimaki et al. | |
| 2014/0257526 A1 * | 9/2014 | Tiwari | F01K 23/068 |
| | | | 700/29 |
| 2014/0277813 A1 * | 9/2014 | Powell | H02J 13/00006 |
| | | | 700/297 |
| 2014/0365276 A1 | 12/2014 | Harsha et al. | |
| 2015/0019458 A1 | 1/2015 | Dorai et al. | |
| 2018/0088601 A1 | 3/2018 | Fontana et al. | |
| 2018/0285515 A1 | 10/2018 | Sichei | |
| 2021/0012190 A1 | 1/2021 | Murali et al. | |
| 2021/0110487 A1 | 4/2021 | Zhou et al. | |

OTHER PUBLICATIONS

Smith, "An Iterative Mutual Information Histogram Technique for Linkage Learning in Evolutionary Algorithms", 2005 IEEE Congress on Evolutionary Computation, pp. 2166-2173, URL:<https://ieeexplore.ieee.org/document/1554963?source=IQplus> (Year: 2005).*

Zhou et al., "Real-Time Opportunity Discovery for Productivity Enhancement," filed Sep. 30, 2020, 47 pages.

Subramanian et al., "A Prediction-Optimization Framework for Site-wide Process Optimization," 2019 IEEE International Congress on Internet of Things (ICIOT), 8 pages.

Chu et al., "Fault Detection and Operation Mode Identification Based on Pattern Classification with Variable Selection," Ind. Eng. Chem. Res. 2004, 43, 1701-1710, 10 pages.

Mell et al., "The NIST Definition of Cloud Computing," Recommendations of the National Institute of Standards and Technology, NIST Special Publication 800-145, Sep. 2011, 7 pages.

International Search Report and Written Opinion for International Application No. PCT/CN2022/118876 dated Nov. 25, 2022.

* cited by examiner

PROCESS OPTIMIZATION WITH JOINT-LEVEL INFLOW MODEL

BACKGROUND

A plant operation can be defined by one or more modes, which can define point-in-time statuses of the plant operation. One type of mode, a hard category type, can define an operational configuration of an entire production process, such as manufacturing a pipe configuration, a unit operation status and/or the like. A soft category type of mode can define a production level of local and/or global operations. In the sand oil industry, there is a complex process of converting sand oil into Synthesis Crude Oil (SCO). To complete a SCO production generation, there can be multiple stages involved, including primary extraction, secondary extraction and upgrading. Each stage can involve multiple components and processes. One or more of the involved modes can be explicitly known by one or more managing entities. Other modes can be hidden and/or can identified through advanced analytic models. As used herein, the term "entity" can refer to a machine, device, component, hardware, software, smart device and/or human.

In one example of a plant operation, such as related to the sand oil industry, hot processed water (HPW) can be used to separate production fluids into separate components of oil, water, sand and gas in first and second stage separators. Preheating of the production fluids prior to entry into the first stage separator can be accomplished by direct mixing with HPW taken from the effluent of the first stage separator and of the second stage separator.

Steam can be used to generate HPW. One or more flow rates of steam usage, HPW flow rate, and HPW temperatures can interact with process flow in the plant operation rates via heat exchange. This coupled system can lead to interaction between flow rate and temperature, which together can be referred to as quality of flow. A bilinear optimization problem can result when applying mass, heat and/or energy balance models for flows and temperature or other qualities of flows.

Indeed, continuous flow production systems can involve large process flow diagrams with various flow-coupled units/processes. Development of optimal production plans that involve both throughput maximization and/or quality of flow can be desired. Throughput can be defined as flow-rate, and quality can be defined as at least one of temperature of flow or component concentration in flow, for example.

Data-driven regression-based optimization can exploit linear and piecewise linearizable models to developing optimal production plans by converting the problem into a mathematical program. Quality-flowrate combination can lead to hard bilinear optimization problems, even in the simplest case of linear and piecewise linear/linearizable regression models for quality and flow-rate respectively. As such, it will be appreciated that bilinear models can be difficult to address and can involve approximations as well as long solution times with no reliable solvers.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, systems, computer-implemented methods, apparatuses and/or computer program products are described that can facilitate a process to monitor and inform a change to a production control variable and/or metric.

According to an embodiment, a system can comprise a memory that stores computer executable components and a processor that executes the computer executable components stored in the memory. The computer executable components can comprise an initialization component that identifies values of inflow data of one or more inflows of a set of inflows to a manufacturing process as control variables, and a computation optimization component that optimizes one or more intermediate flows, outflows or flow qualities of the manufacturing process using, for mode-specific regression models, decision variables that are based on a set of joint-levels of the control variables.

According to another embodiment, a computer-implemented method can comprise identifying, by a system operatively coupled to a processor, values of inflow data of one or more inflows of a set of inflows to a manufacturing process as control variables. The method also can comprise optimizing, by the system, one or more intermediate flows, outflows or flow qualities of the manufacturing process using, for mode-specific regression models, decision variables that are based on a set of joint-levels of the control variables.

According to yet another embodiment, a computer program product can facilitate a process to transform original operational data into updated operational data, the computer program product comprising a computer readable storage medium having program instructions embodied therewith, the program instructions executable by a processor to cause the processor to identify, by the processor, values of inflow data of one or more inflows of a set of inflows to a manufacturing process as control variables. The program instructions executable by the processor also can cause the processor to optimize, by the processor, one or more intermediate flows, outflows or flow qualities of the manufacturing process using, for mode-specific regression models, decision variables that are based on a set of joint-levels of the control variables.

An advantage of such system, computer-implemented method and/or computer program product can be conversion of flow rate and/or other control variable from a continuous valued variable to a finite-valued variable. This can allow for conversion of a bilinear problem to be solved as a linear problem in optimization.

Another advantage of such system, computer-implemented method and/or computer program product can be representation of a manufacturing process operational envelope in terms of an automatically identified set comprising joint combinations of multiple contemporaneous flow rates of flows that can define the manufacturing process. The representation can be used to compute an optimal set point of the contemporaneous flow rates by choosing an optimal candidate combination of joint flows from the flows having the automatically identified set and by further determining an optimal modulation to one or more of the flows having the automatically identified set, based on the chosen candidate combination of joint flows.

In one or more embodiments of the above system, computer program product and/or method, an operation mode determination component can determine the mode employing historical multivariate sensor data from the manufacturing process or run-time multivariate sensor data from the manufacturing process. An advantage of such system, computer-implemented method and/or computer program product can be aligning of the flow change with historical operation of the plant.

DETAILED DESCRIPTION

One or more embodiments described herein relate to managing plant and production facilities, and more specifically, to using automated computer algorithms and hardware to monitor and/or inform a change to a production control variable and/or metric.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

An existing approach of data-driven regression-based production optimization can work well when the only objective is flow/throughput maximization. However, one can wish to consider both flow and quality, for example defined as at least one of temperature of flow or component concentration in flow. Briefly, it will be appreciated that physical balance equations for net quality that results from intermixing flows with respective qualities can lead to bilinear terms. For example, consider Equation 1: $F_1*T_1+F_2*T_2=(F_1+F_2)*T_{net}$. In Equation 1, the $F_1$ and $F_2$ can be inflows before a flow join point, and the $T_1$ and $T_2$ can be corresponding temperatures or chemical concentrations, defined as quality of flow, where $(F_1+F_2)$ can be an outflow rate after the flow join point, and $T_{net}$ can be the combined temperature or combined chemical concentrations.

It will be appreciated that in theory, bilinear mathematical optimization can be non-deterministic polynomial-time hard (NP-Hard) problems to solve, different from mixed-integer linear programming (MILP) problems, which still can be practically tractable even for large sizes (albeit NP-hard in theory). Current solver technologies in practice/computations can be ineffective relative to bilinear mathematical optimization problems. For example, relative to plant operations comprising multi-plant and/or multi-process production systems, bilinear models can provide effective solutions and/or take an unacceptable amount of time to solve.

One or more systems, methods and/or computer-program products described herein can address one or more of these deficiencies, such as by exploiting real-life characteristics of process operational data, and/or by applying an algorithm that can solve for both quality and throughput using mixed-integer linear programs.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 5:
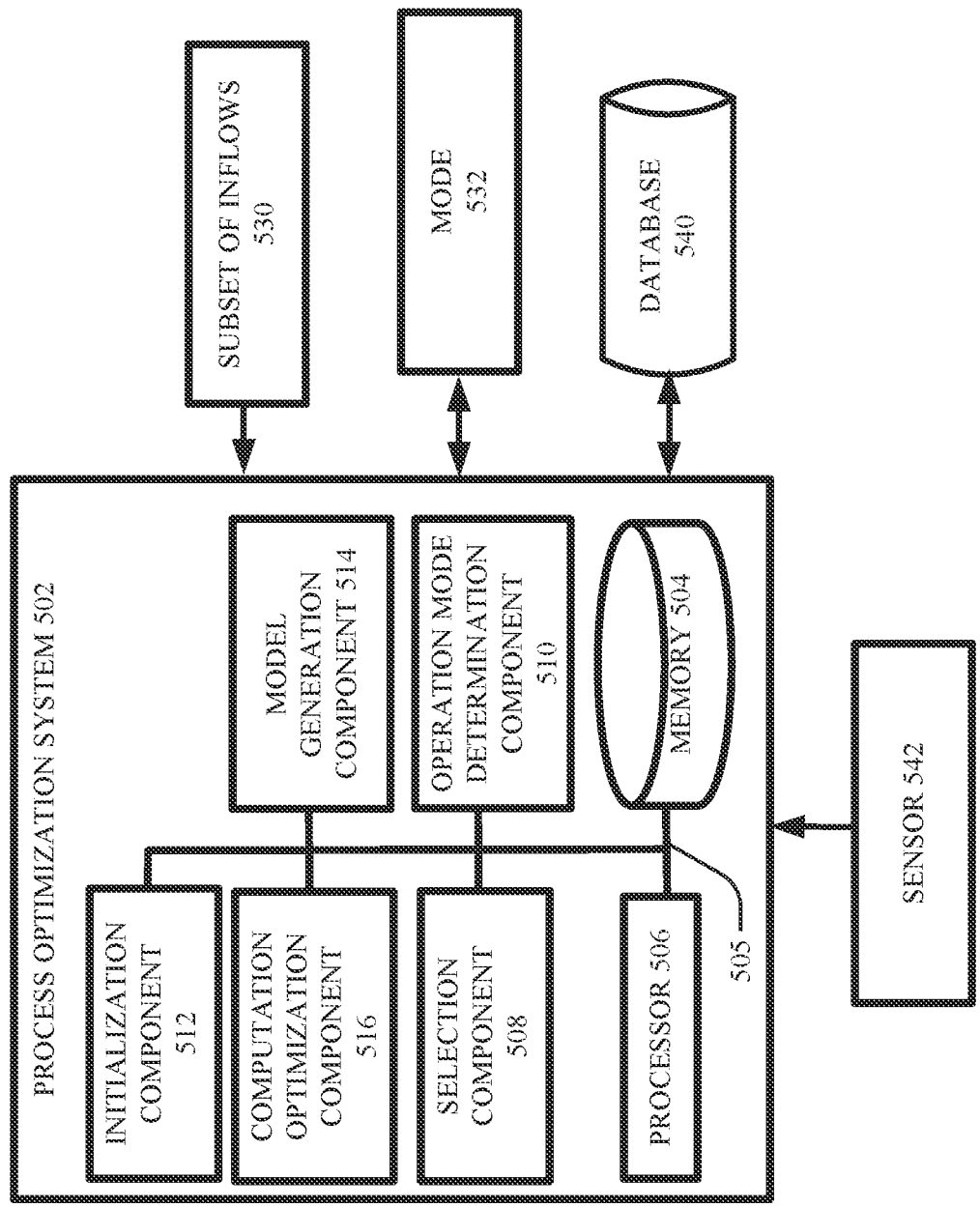
FIG. 5 illustrates a block diagram of an example, non-limiting system that can facilitate optimization of a manufacturing process, in accordance with one or more embodiments described herein.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system 500 as illustrated at FIG. 5, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIG. 5 and/or with other figures described herein.

Figure 1:
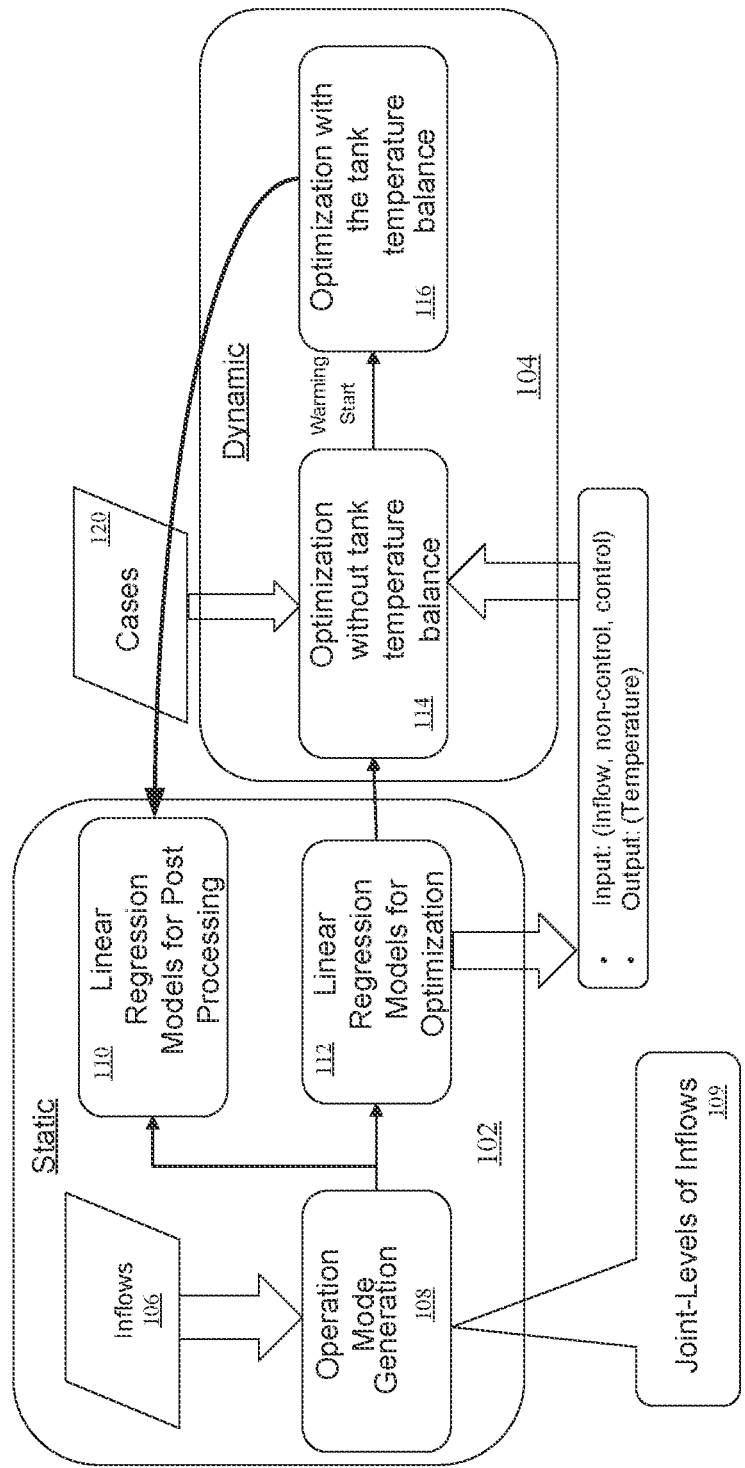
FIG. 1 illustrates a block diagram of an example mode based approach to process optimization, in accordance with one or more embodiments described herein.

Turning now first to FIG. 1, generally, production plants can be operated at a finite number of speeds in practice, due to engineering considerations, pumping speeds that can be finitely specified and/or defined, production economy considerations, and/or the like. There can be a degree of flexibility in varying actual flows around any of the finite speeds. While these factors often are not known in advance or readily available in existing technologies, sensor data can be analyzed to automatically discover one or more joint-levels of operations.

At FIG. 1, a mode based approach to process optimization of a manufacturing process, such as relative to a production plant, is illustrated. While one or more portions of the discussion herein relate to a production plant, it will be appreciated that the mode based approach discussed herein can have other applications. For example, alternative areas for use include, but are not limited to, process-oriented manufacturing industries such as oil sand, food and steel, and optimization technologies, such as related to data networks or data traffic.

Looking to FIG. 1, the mode-based approach can be envisioned as comprising a static portion or training portion 102 and a case-based or scenario-based optimization decision support or dynamic portion 104. The static-based portion 102 can complete operation mode generation 108 and mode-specific regression model generation 110, 112. The operation modes can partition the historical operations into one or more finite groups. The operation modes can be used as binary decision variables to feed into an optimization decision support portion. The operation mode specific regression models can be used to build accuracy into relationships between inflows, outflows and/or flow qualities within an operation mode.

That is, the static-based portion 102 can include employing inflows 106 for operation mode generation 108 (also, herein referred to as Step 1). Operation mode generation 108 can include defining one or more joint-level inflows 109 having joint-levels of control variables that are values of inflow data of the joint-level inflows 109. It will be appreciated that operation mode generation 108 also can include sub-mode generation, as will be discussed below with reference to Step 2.

The operation modes generated can be employed to generate one or more mode-specific regression models (e.g., Step 3), such as linear regression models for post-processing 110 and linear regression models for optimization 112. Further, the linear regression models for optimization 112 can be employed relative to the scenario-based, dynamic portion 104, with inputs such as inflows, non-control variables, and control variables, to provide one or more process variations. Control variables can be variables that are used for operation adjustments for optimization. Non-control variables can be variables that are not used for operation adjustments for optimization.

At FIG. 1, the process optimization is described as being optimization without tank temperature balance 114, employing an output (e.g., temperature) from the linear regression models for optimization 112 to provide an optimization with tank temperature balance 116. As also shown at the diagram 100, historical cases 120 can be employed to inform the optimization without tank temperature balance 114. The optimization with the tank temperature balance 116 can be employed to provide one or more inputs for the linear regression models for post-processing 110.

In view of FIG. 1, a basic process can be outlined for mode-based process optimization.

At a first step (Step 1), an automatic representation of a continuous flow multi-process production system can be learned in terms of a finite number of joint-levels of inflows.

Each joint-level of inflows can have a certain combination of values for one or more key flow rates of the multi-process production system, such as defined as a certain speed or mode of operation. That is, each joint-level of inflows can have joint-levels of control variables that are values of the inflow data of the inflows of the joint-level of inflows.

A fused lasso based multivariate level discovery model can be formulated using multivariate total variation, to automatically discover a desired number of joint-levels across a set of inflows, such as across a set of all key inflows, such as from historical sensor data. This set can be a finite set of operation modes. An operation mode can be defined as a joint-level combination of controlled inflows (e.g., mode variables), and thus can have a joint-level of control variables. A set of operation modes can together be defined by a set of joint-levels of the control variables.

At a second step (Step 2), within each mode, further variation can be allowed using a finite set of variations for each inflow (e.g., mode variable) around an operation mode's level in the respective joint-level, such as using statistical analysis in each operation mode. That is, the finite set of operation modes can be enriched hierarchically by allowing a further finite set of variations for each flow-rate within each joint-level of inflows. These further finite set of variations for each flow-rate within each joint-level of inflows can be referred to as sub-modes. The result is a representation having a finite hierarchy of modes and sub-modes.

At a third step (Step 3), the representation can be exploited to generate one or more mode-specific regression models. It will be appreciated that variables of joint-level inflow (such as the inflows) can have limited variance, and thus a linear regression can provide a more accurate model than a generic regression model. Additionally, in connection with the regression models, one or more physical constraints can be in place, such as mass balance and/or heat balance. This representation also can be employed to automatically convert a bilinear mathematical optimization into a mixed-linear linear program. That is, with respect to the aforementioned Equation 1, bilinear terms such as "$F_i*T_i$," can become linear, such as when $F_i$ is fixed.

For example, the optimization problem can be posed in terms of selectively choosing the mode for the joint-level, and further in terms of selectively choosing the sub-mode for each inflow (e.g., mode variable) that makes up the joint-level, thus converting the bilinear mathematical optimization problem to a MILP problem. Accordingly, an effective method for developing optimal production plans for a considered problem can be employed.

At a fourth step (Step 4), the regression models can be employed to solve one or more optimization problems. Inputs can include the inflows and one or more control variables and/or non-control variables. An example output can be one or more flow temperatures or flow qualities, such as one or more inflow temperatures.

Figure 2:
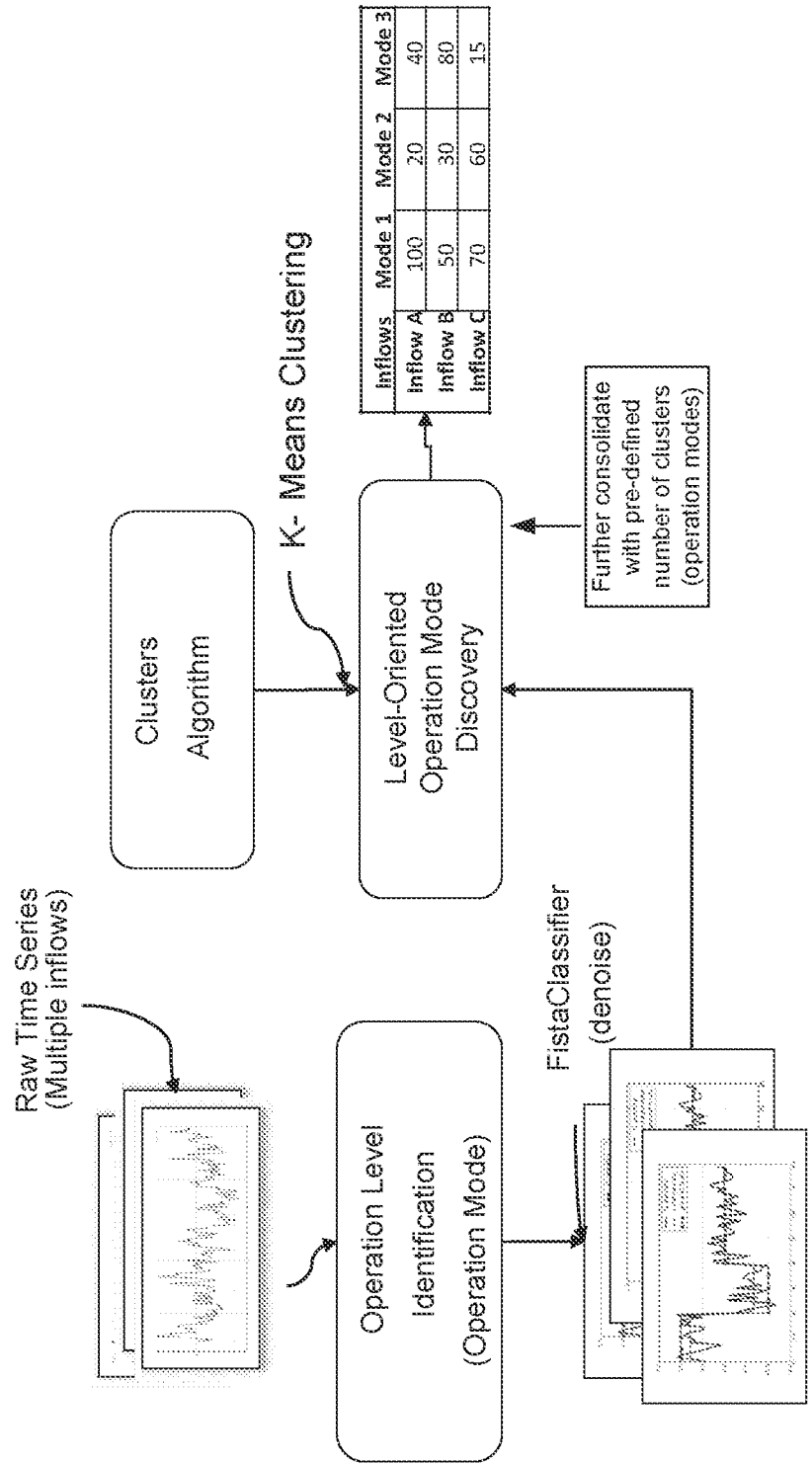
FIG. 2 illustrates another block diagram of an example process for generation of multiple joint-level oriented modes, in accordance with one or more embodiments described herein.

Turning now to FIG. 2, the first step briefly defined above (Step 1) is further described in detail referencing the mode generation diagram 200. The intent of Step 1 can be to automatically discover a quantized representation of physical operation in terms of a finite set of multiple operational modes, where each operation mode can be described in terms of joint-multivariate levels of various inflow rates in the respective process to be optimized. The set of joint-levels of various inflow rates across inflows discovered is a finite set of operation modes. An operation mode can be defined as a joint-level combination of controlled inflows (e.g., mode variables).

The operation mode generation can be completed in two steps as described at FIG. 2 using the historical harvested sensor data representing the physical flowrates of inflows used for control variables. The operation of an HPW system inherently can be operated with operation modes. A Fista-Classifier (or fused lasso for 1D) can be used for noise-removal and/or signal recovery. Then, multiple processed inflows can be fed into a classification algorithm such as k-means clustering to generate the joint-level inflows. An illustrated example with three modes can be found in the table in the right of FIG. 2.

Figure 3:
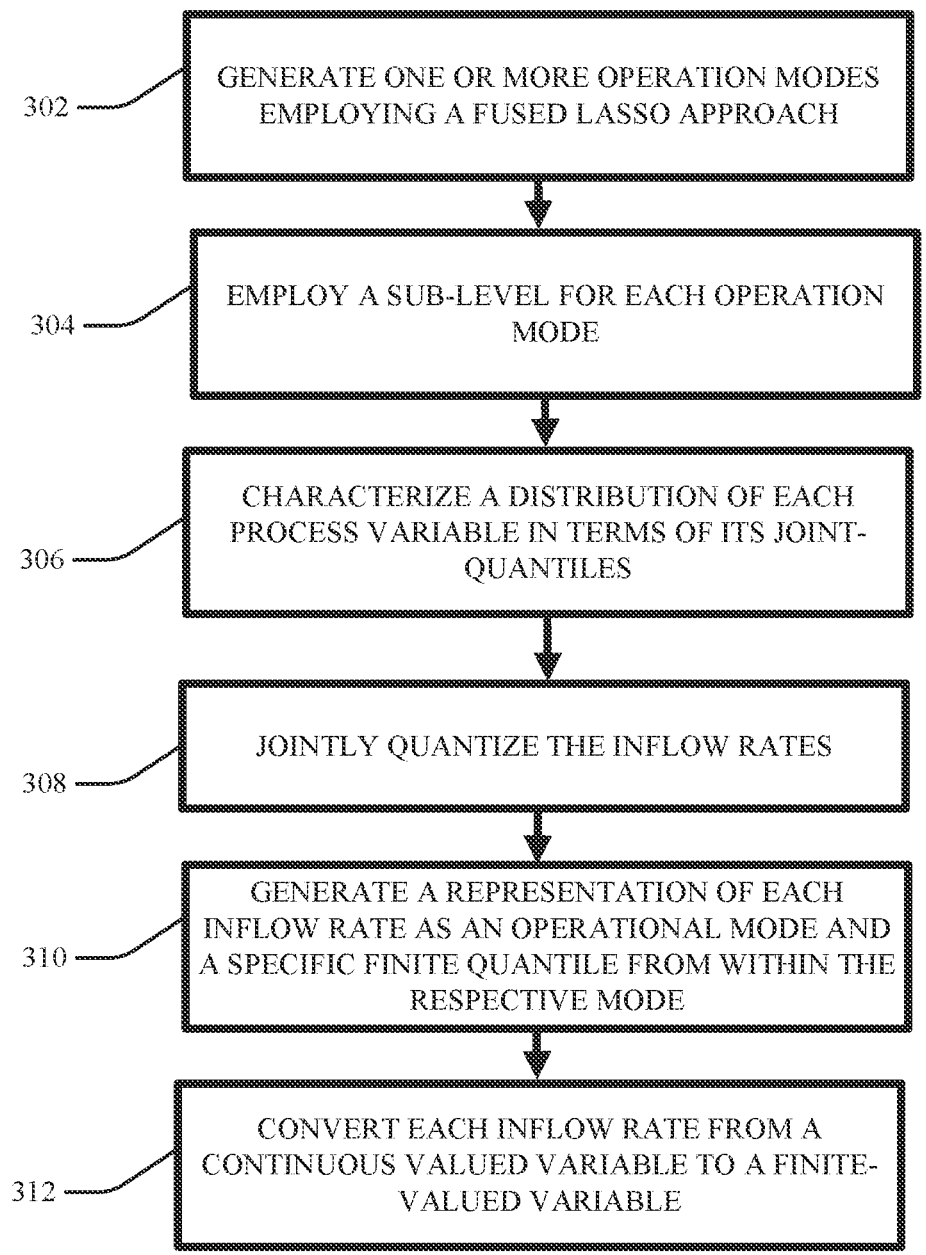
FIG. 3 illustrates a set of operations of a basic algorithm for process optimization, in accordance with one or more embodiments described herein.

Turning next to FIG. 3, the second step briefly defined above (Step 2) is further described relative to an operation mode variation process 300. For each discovered operation mode, a sub-level can be used, comprising characterizing the distribution of each control variable in terms of its joint-quantiles, using historical data and time-stamps that align with the corresponding operation mode and using a finite set of such quantiles (e.g. {Min, 5%, 20%, 40%, 60%, 80%, 95%} within each mode). It is noted that a computational complexity and intractability of the bilinear problem stems from bilinear terms that multiply "flow rate" and "content" (e.g., material content such as composition percentages, or thermal content such as temperature).

By representing the flow rates as a hierarchical (two-level) finite representation, in terms of an operation mode and a specific finite quantile from within the operation mode, flow rate can be converted from a continuous valued variable to a finite-valued variable. That is, using binary variables to choose from the two-level finite representation can allow for recasting the nonconvex bilinear problem into a mixed-integer linear problem for which a practical solver understood by those having ordinary skill in the art can be employed.

Jointly quantizing the various inflow rates into the above hierarchical (two-step) finite set of joint-levels of inflow rates (e.g., control variables) of the joint-levels of inflows in the optimization problem also can constructively ensure mutually compatible flow rates based on historical data. This approach can avoid use of ad hoc constraints that are otherwise employed in such model to ensure mutual compatibility of independently chosen decisions for various flows. Including the sub-level of the input flow variables within each mode allows for enhancing a quality of approximation that results from the quantized representation.

That is, to further enhance the optimization quality, the fine tuning of the joint-level inflows within an operation mode can be performed. In connection therewith, mode-specific regression models can be generated for building one or more relationships among the control variables with other inflows and/or outflows. Furthermore, the inflows within an operation mode can be quantiled to define the sub-modes as decision variables, which can be employed to solve the overall optimization of the respective manufacturing process.

Referring still to FIG. 3, in view of the foregoing the first step generally described above (Step 1) can further be detailed as a basic mode variation algorithm 300 for being employed by a system, such as a computer system, having access to current and/or historical inflow data. Operation 302 can comprise generating one or more modes employing a fused lasso approach. Operation 304 can comprise employing a sub-level for each mode. Operation 306 can comprise characterizing a distribution of each control variable in terms of its joint-quantiles. Operation 308 can comprise jointly quantizing the inflow rates. Operation 310 can comprise generating a representation of each inflow rate as an operational mode and a specific finite quantile from within the respective mode. Operation 312 can comprise converting each inflow rate from a continuous valued variable to a finite-valued variable.

Figure 4:
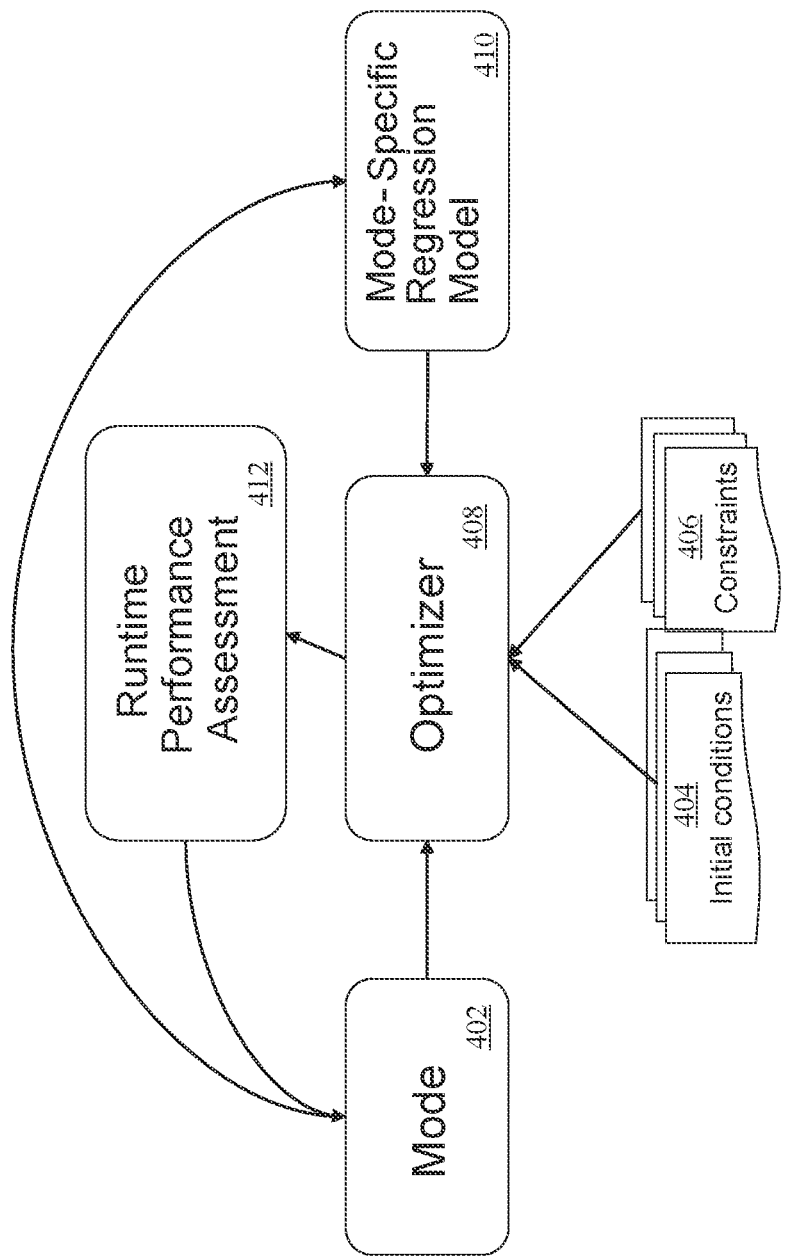
FIG. 4 illustrates a flow diagram of a basic process optimization process, in accordance with one or more embodiments described herein.

Referring now to FIG. 4, the fourth step briefly defined above (Step 4) is further described in detail referencing the process optimization diagram 400.

Employing the modes 402 discovered at Step 1, initial conditions 404, constraints 406 in an optimizer 408, and one or more mode-specific regression models 410, one or more values of a process can be optimized and employed, such as in a runtime performance assessment 412. An initial condition 404 can be a current state of the manufacturing process, such as in terms of inflows, inflow rates and/or other related values. An optimizer 408 can be a computation component or software solving an optimization problem specified by a set of control variable (e.g., values of inflows), constraints and an objective.

Mode-specific regression models can be learned from sensor data to capture relevant input-output predictive relationships and then can be employed within optimization models (e.g., optimizer 408) that compute set points for control variables over a lookahead horizon to optimize production-related key performance indices. That is, the mode-specific regression models can be learned employing the control variables (e.g., inflow values) from identified inflows of the joint-levels of inflows. The mode-specific regression models can be employed in place of first principle physical or chemical equations to capture one or more relationships and/or dependences of the inflows, outflows and the output of the respective manufacturing process.

Turning next to FIG. 5, illustrated is a block diagram of an example, non-limiting system 500 that can facilitate a process to optimize a manufacturing process having one or more inflows, in accordance with one or more embodiments described herein.

As illustrated at FIG. 5, the non-limiting system 500 can comprise a process optimization system 502. The process optimization system 502, as illustrated, can comprise any suitable type of component, machine, device, facility, apparatus and/or instrument that comprises a processor and/or can be capable of effective and/or operative communication with a wired and/or wireless network. All such embodiments are envisioned. For example, process optimization system 502 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the process optimization system 502 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The process optimization system 502 can be associated with, such as accessible via, a cloud computing environment. For example, the process optimization system 502 can be associated with a cloud computing environment 1050 described below with reference to FIG. 10 and/or with one or more functional abstraction layers described below with reference to FIG. 11 (e.g., hardware and software layer 1160, virtualization layer 1170, management layer 1180 and/or workloads layer 1190).

It will be appreciated that operation of the non-limiting system 500 and/or of the process optimization system 502 is not limited to optimization of a single flow and/or flow quality over a time horizon. Rather, operation of the non-limiting system 500 and/or of the process optimization system 502 can be scalable. For example, the non-limiting system 500 and/or the process optimization system 502 can facilitate optimization of one or more dependent flows or flow qualities, with such as of one or more modes as part of decision variables (e.g., a set of inflows).

The process optimization system 502 can comprise one or more components, such as a memory 504, processor 506, bus 505, selection component 508, operation mode determination component 510, initialization component 512, model generation component 514, and/or computation optimization component (COC) 516. Generally, process optimization system 502 can facilitate optimization of a process, such as optimization of one or more inflows of a manufacturing process, such as of an operation mode comprised by inflows of the manufacturing process. A set of inflows to the process, being a subset of all inflows to the process, can be identified and values thereof can be employed as control variables. That is, one or more values of inflow data relative to the selected subset of inflows, such as flow rate or temperature can be employed as control variables. Employment of a fused lasso approach can generate one or more joint-levels of inflows defining an operation mode of inflows to be optimized, employing the control variables. That is, employment of a fused lasso approach can result in one or more joint-levels of control variables (of the one or more joint-levels of inflows). This approach can allow for converting each flow rate of the inflows of an operation mode (or of more than one operation mode) from a continuous valued variable to a finite-valued variable. The result is conversion of a bilinear optimization problem to a linear optimization problem.

Next discussion first turns to the processor 506, memory 504 and bus 505 of the process optimization system 502.

For example, in one or more embodiments, process optimization system 502 can comprise a processor 506 (e.g., computer processing unit, microprocessor, classical processor, quantum processor and/or like processor). In one or more embodiments, a component associated with process optimization system 502, as described herein with or without reference to the one or more figures of the one or more embodiments, can comprise one or more computer and/or machine readable, writable and/or executable components and/or instructions that can be executed by processor 506 to facilitate performance of one or more processes defined by such component(s) and/or instruction(s). In one or more embodiments, the processor 506 can comprise the selection component 508, operation mode determination component 510, initialization component 512, model generation component 514, and/or computation optimization component 516.

In one or more embodiments, the process optimization system 502 can comprise a computer-readable memory 504 that can be operably connected to the processor 506. The memory 504 can store computer-executable instructions that, upon execution by the processor 506, can cause the processor 506 and/or one or more other components of the process optimization system 502 (e.g., selection component 508, operation mode determination component 510, initialization component 512, model generation component 514, and/or computation optimization component 516) to perform one or more actions. In one or more embodiments, the memory 504 can store computer-executable components (e.g., selection component 508, operation mode determination component 510, initialization component 512, model generation component 514, and/or computation optimization component 516).

Process optimization system 502 and/or a component thereof as described herein, can be communicatively, electrically, operatively, optically and/or otherwise coupled to one another via a bus 505 to perform functions of non-limiting system 500, process optimization system 502 and/or one or more components thereof and/or coupled therewith. Bus 505 can comprise one or more of a memory bus, memory controller, peripheral bus, external bus, local bus, quantum bus and/or another type of bus that can employ one or more bus architectures. One or more of these examples of bus 505 can be employed to implement one or more embodiments described herein.

In one or more embodiments, process optimization system 502 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system 500 can reside in the cloud, and/or can reside locally in a local computing environment (e.g., at a specified location(s)).

In addition to the processor 506 and/or memory 504 described above, process optimization system 502 can comprise one or more computer and/or machine readable, writable and/or executable components and/or instructions that, when executed by processor 506, can facilitate performance of one or more operations defined by such component(s) and/or instruction(s).

Turning now to one or more additional operations of the process optimization system 502, the selection component 508 can be employed by an entity to selectively identify one or more inflows of a set of inflows to be employed as control variables for process optimization. This subset of inflows 530 can comprise one or more values, such as for flow rates, temperatures, and/or the like to employ as control variables. Where the entity is external to the process optimization system 502, it will be appreciated that the selection can be submitted, transmitted and/or otherwise sent to the process optimization in any suitable format, such as text, binary and/or the like.

The initialization component 512 can be employed in cooperation with the selection component 508. The initialization component 512 can determine the one or more values of the one or more selected inflows of the subset 530. The determination can be made by reading one or more lookup tables, for example, having data stored and/or cached relative to the subset of inflows 530.

The operation mode determination component 510 can employ a fused lasso approach (e.g., relative to Step 1 above) to determine one or more operation modes 532 (e.g., each relative to one or more inflows, such as a joint-level of inflows). A set of operation modes together can be defined by a set of joint-levels of the control variables, such as a finite set of joint-levels of the control variables. An operation mode can be defined in terms of any of one or more levels of operation/production in a continuous flow process in terms of the joint-level of operation as it pertains to any set of one or more control variables, a representation of joint dynamics of any set of one or more control variables over a contiguous duration of predefined length of a time horizon, or one or more joint configurations of the uptime/downtime of different units that make up a process flow of the manufacturing process. Each of these variances can be relative to a set of one or more inflows, and thus identified as an operation mode.

In accordance with Step 1 provided above, a fused lasso approach can be applied over continuous inflows to create one or more joint-operation modes, based on a finite number of joint-levels of operations of the process to be optimized, and in turn based on a finite number of joint-levels of control variables of the inflows. As indicated above, a fused lasso based multivariate level discovery model 534 can be formulated using multivariate total variation, to automatically discover a desired number of joint-levels across a set of inflows, such as across a set of all key inflows, such as from historical multivariate sensor data and/or from run-time time-stamped multivariate sensor data. This set can be a finite set of operation modes, e.g., the operation modes 532 discovered as a result of performance of the operation mode determination component 510. An operation mode can be defined as a joint-level combination of controlled inflows (e.g., mode variables).

Regarding receipt of the sensor data, historical data can be stored at one or more storage databases 540, which can be suitably accessible by the operation mode determination component 510. It will be appreciated that the one or more storage databases 540 can be located at the process optimization system 502 or external thereto.

Also regarding receipt of the sensor data, any suitable means of communication can be employed to receive, download, and/or otherwise retrieve data from one or more sensors 542 of the process (e.g., manufacturing process) to be optimized. Sensor data can be provided in any suitable format, such as a text format, binary format and/or another suitable format. In one or more embodiments, the sensor data can be received by a component other than the operation mode determination component 510, such as the memory 504, a mail component and/or a download component.

One or more communications between one or more components of the non-limiting system 500, and/or between a sensor 542 and the non-limiting system 500, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

The determined operation modes 532 can further be varied into a representation having a finite hierarchy of modes and sub-modes, such as by the operation mode determination component 510. This process, in accordance with Step 2 described above, can be allowed using a finite set of variations for each inflow (e.g., mode variable) around a mode's level in the respective joint-level, such as using statistical analysis in each mode.

Additionally and/or alternatively, the operation mode determination component 510 can apply k-means clustering or other classifier to reduce the number of clusters as the joint-operation mode. That is, the operation mode determination component 510 can apply k-means clustering or other classifier to reduce a number of joint-levels of inflows of an operation mode.

The model generation component 514 can generate a mode-specific regression model for each operation mode 532 discovered. The control variables relative to the one or more determined inflows of the subset 530 are used in the mode-specific regression models, such that the control variables will be employed when the mode-specific regression models are in turn employed to generate a suggested or predicted manufacturing process change, such as a flow change.

The computation optimization component (COC) 516 can perform one or more process employing the control variables, regression models and operation modes 532. For example, the COC 516 can solve an optimization problem related to a respective manufacturing process to optimize one or more inflows, intermediate flows, outflows and/or flow qualities of the manufacturing process.

The COC 516 generally can generate a flow change for one or more of the discovered modes 532 of the manufacturing process, by employing the one or more values of the subset of inflows 530 as control variables. That is, one or more values of each operation mode can be employed as decision variables for a mode-specific optimization relative to each specific operation mode and further employing a mode-specific regression model for each respective operation mode. Put another way, an optimization solution, such as a flow change or other output from the COC 516, can result in an optimization through a decision of choosing an operation mode to employ for any particular optimization.

Figure 6:
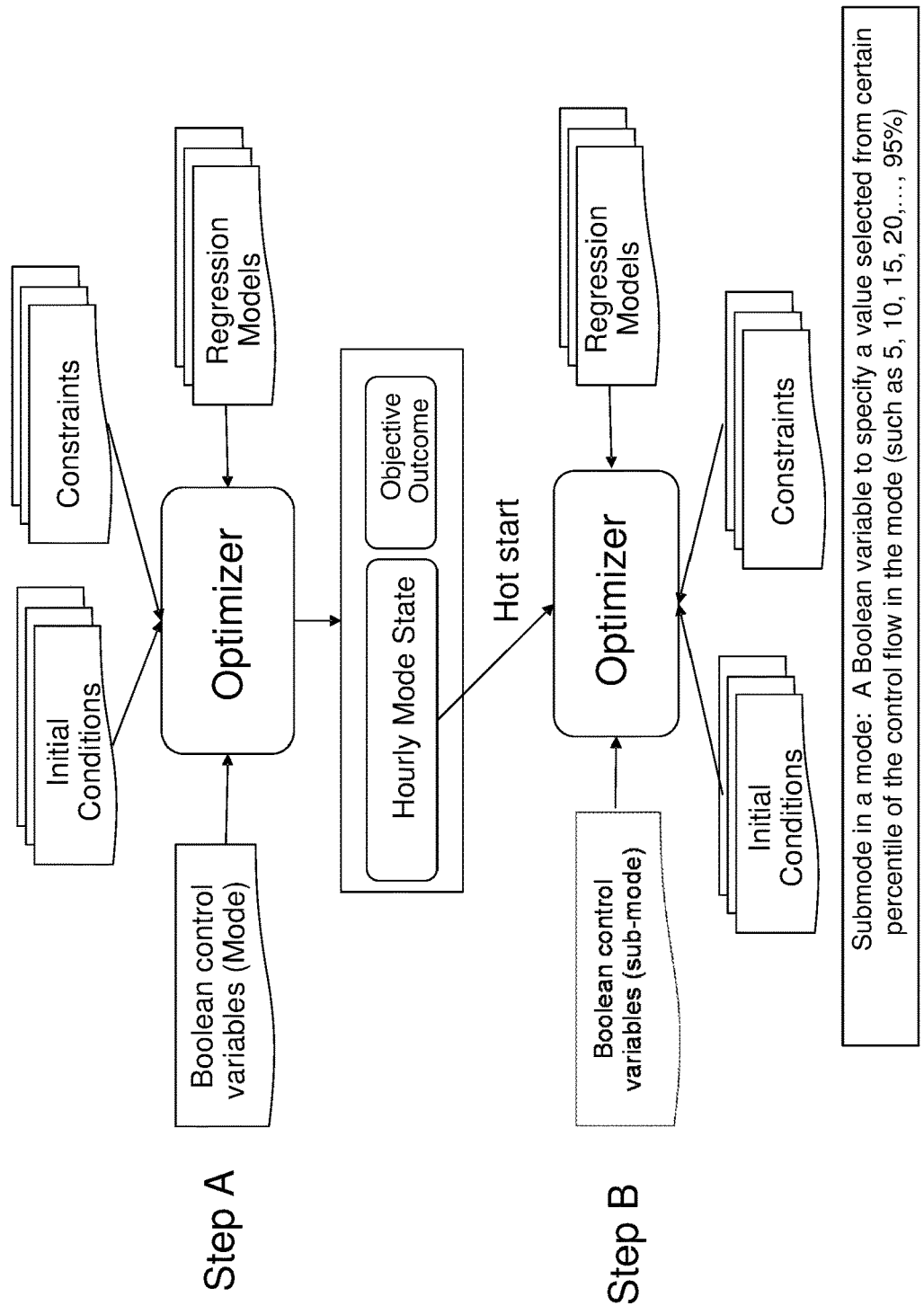
FIG. 6 illustrates a flow diagram of another process optimization process, in accordance with one or more embodiments described herein.

Turning now to FIG. 6, an exemplary optimization 600 is illustrated. For example, initial conditions, such as inflows, can be employed to solve for flow balancing. As depicted, it will be appreciated that an optimization output from an optimizer, such as the COC 516, further can be employed as an input to another optimization.

Figure 7:
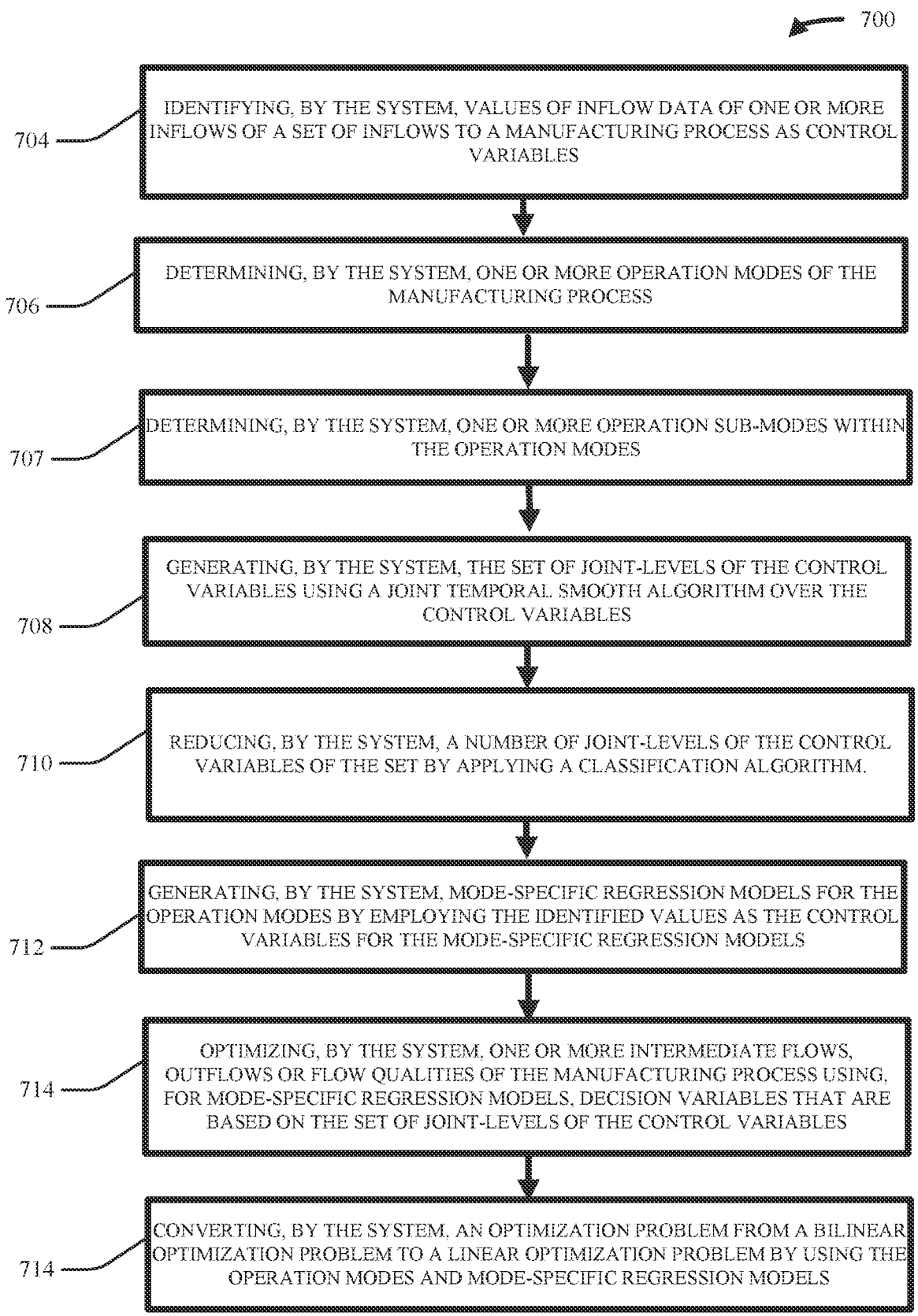
FIG. 7 illustrates a flow diagram of an example, non-limiting computer-implemented method that can facilitate optimization of a manufacturing process, in accordance with one or more embodiments described herein.
Figure 8:
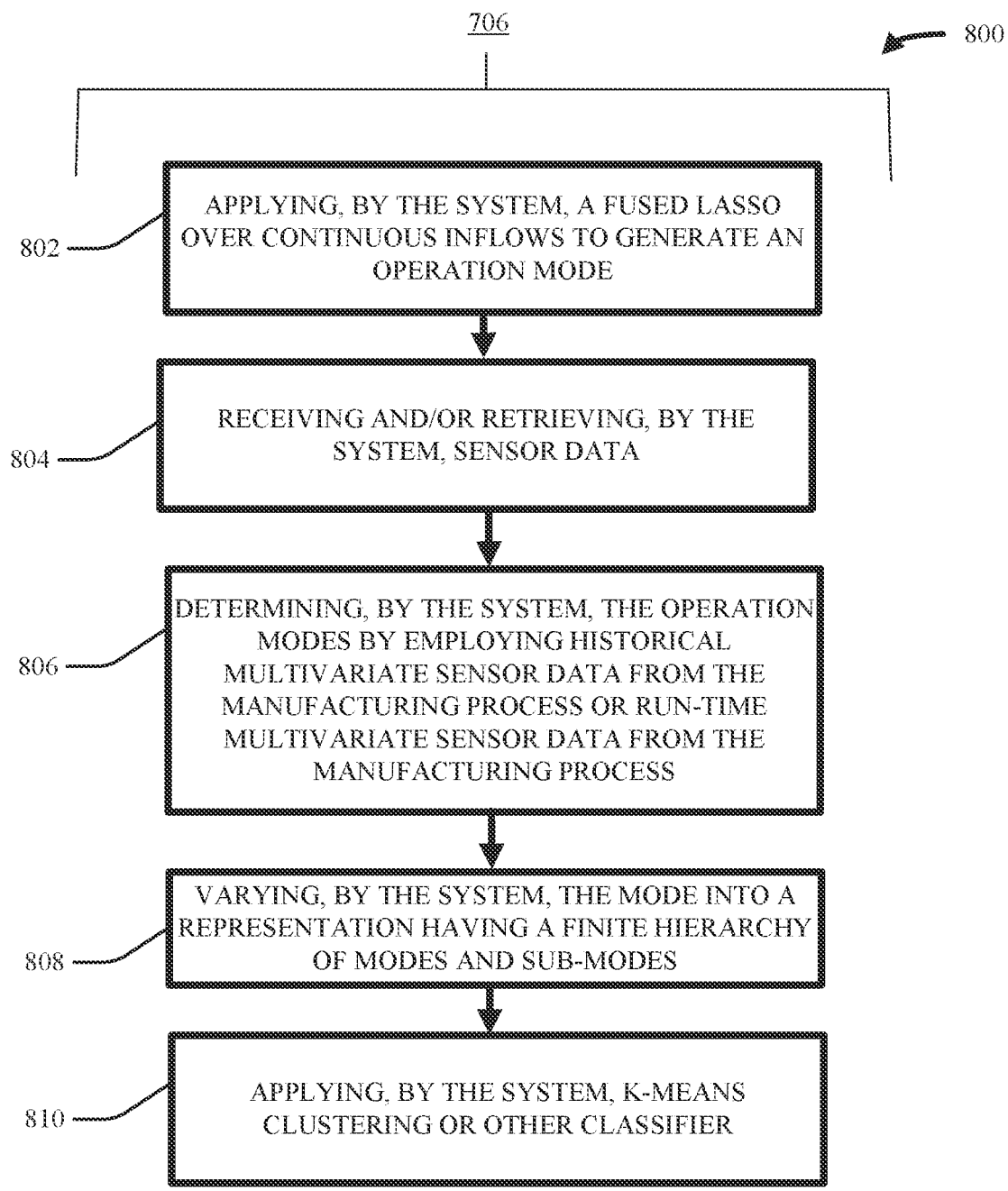
FIG. 8 illustrates a continuation of the flow diagram of FIG. 7, of an example, non-limiting computer-implemented method that can facilitate optimization of a manufacturing process, in accordance with one or more embodiments described herein.

Turning now to FIGS. 7 and 8, these figures together illustrate a flow diagram of an example, non-limiting computer-implemented method 700 that can facilitate a optimize a manufacturing process, in accordance with one or more embodiments described herein with respect to the non-limiting system 500. It will be appreciated that while the computer-implemented method 700 is described relative to the non-limiting system 500, the computer-implemented method 700 can be applicable also to one or more other non-limiting systems in accordance with description provided herein. Repetitive description of like elements and/or processes employed in respective embodiments is omitted for sake of brevity.

Looking first to 704 at FIG. 7, the computer-implemented method 700 can comprise identifying, by a system operatively coupled to a processor (e.g., initialization component 512), values of inflow data of one or more inflows of a set of inflows (e.g., subset 530) to a manufacturing process as control variables.

At 706, the computer-implemented method 700 can comprise determining, by the system (e.g., operation mode determination component 510), operation modes of the manufacturing process, wherein the operation modes are together defined by a set of joint-levels of the control variables, and wherein the optimizing of the one or more intermediate flows, outflows and/or flow qualities uses the operation modes as part of the decision variables combining with the mode-specific regression models to connect the decision variables and other variables.

At 707, the computer-implemented method 700 can comprise determining, by the system (e.g., operation mode determination component 510), one or more operation sub-modes within the operation modes, which one or more operation sub-modes are based on a percentile of the distribution of the control variables of the set of joint-levels of the control variables within the operation modes.

At 708, the computer-implemented method 700 can comprise generating, by the system (e.g., operation mode determination component 510), the set of joint-levels of the control variables using a joint temporal smooth algorithm over the control variables.

At 710, the computer-implemented method 700 can comprise reducing, by the system (e.g., operation mode determination component 510), a number of joint-levels of the control variables of the set by applying a classification algorithm At 712, the computer-implemented method 700 can comprise generating, by the system (e.g., model generation component 514), mode-specific regression models for the operation modes by employing the identified values as the control variables for the mode-specific regression models.

At 714, the computer-implemented method 700 can comprise optimizing, by the system (e.g., computation optimization component 516), one or more intermediate flows, outflows or flow qualities, such as temperature of the manufacturing process, such as over a specified time horizon, using, for mode-specific regression models, decision variables that are based on a set of joint-levels of the control variables.

At 716, the computer-implemented method 700 can comprise converting, by the system (e.g., via a combination of the initialization component 512, operation mode determination component 510, selection component 508 and computation optimization component 516), an optimization problem (e.g., addressed by the computation optimization component 516) from a bilinear optimization problem to a linear optimization problem by using the operation modes and mode-specific regression models.

Next, FIG. 8 illustrates a continuation of the method 700 illustrated at the flow diagram of FIG. 7. That is, at FIG. 8, the method 800 represents one or more operations and/or processes comprised by the determining at operation 706 of FIG. 7. Repetitive description of like elements and/or processes employed in respective embodiments is omitted for sake of brevity.

At 802, the computer-implemented method 800 can comprise applying, by the system (e.g., operation mode determination component 510), a fused lasso over continuous inflows to generate an operation mode (e.g., operation mode 532).

At 804, the computer-implemented method 800 can comprise receiving and/or retrieving, by the system (e.g., operation mode determination component 510), historical multivariate sensor data and/or from run-time time-stamped multivariate sensor data (e.g., from one or more sensors 542).

At 806, the computer-implemented method 800 can comprise determining by the system (e.g., operation mode determination component 510), the operation modes by employing historical multivariate sensor data from the manufacturing process or run-time multivariate sensor data from the manufacturing process.

At 808, the computer-implemented method 800 can comprise varying, by the system (e.g., operation mode determination component 510), the mode (e.g., operation mode 532) into a representation having a finite hierarchy of modes and sub-modes.

At 810, the computer-implemented method 800 can comprise applying, by the system (e.g., operation mode determination component 510), k-means clustering or other classifier to reduce the number of clusters of a mode (e.g., operation mode 532).

For simplicity of explanation, the computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In summary, the one or more embodiments described herein can comprise a memory 504 that stores computer executable components and a processor 506 that executes the computer executable components stored in the memory 504. The computer executable components can comprise an initialization component 512 that can identify a value of inflow data relative to one or more inflows of a set of inflows 530 to a manufacturing process, and a computation optimization component 516 that can generate a flow change for an operation mode 532 of the manufacturing process by employing the value as a control variable, wherein the operation mode 532 is defined relative to one or more mode inflows being different from the one or more inflows.

An advantage of such systems, computer-implemented methods and/or computer program products, as described in the one or more embodiments provided above, can be employment to automatically convert a bilinear mathematical optimization into a mixed-linear linear program. That is, using binary variables to choose from the two-level finite representation can allow for recasting the nonconvex bilinear problem into a mixed-integer linear problem for which a practical solver understood by those having ordinary skill in the art can be employed. This approach can avoid use of ad hoc constraints that are otherwise employed in such model to ensure mutual compatibility of independently chosen decisions for various flows. Including the sub-level of the input flow variables within each mode allows for enhancing a quality of approximation that results from the quantized representation.

In view of the one or more embodiments, a practical application of the process optimization systems described herein is that optimizations can actually occur, such as where bilinear problems are too difficult to solve relative to existing techniques, and/or such problems can be solve faster than with existing techniques. In this way, a process can be more efficiently optimized.

Moreover, it will be appreciated that a process optimization system described herein can be implemented in one or more domains to enable scaled process optimizations relative to one or more processes and/or relative to one or more modes of a process.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in manufacturing and/or data fields, and cannot be equally practicably implemented in a sensible way outside of a computing environment.

It also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively transform one or more bilinear optimization problems into a solvable Mixed Integer Linear Programming (MILP) in the time that one or more embodiments described herein can facilitate this process. And, neither can the human mind nor a human with pen and paper electronically transform one or more bilinear optimization problems into a solvable Mixed Integer Linear Programming (MILP) problem as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 9:
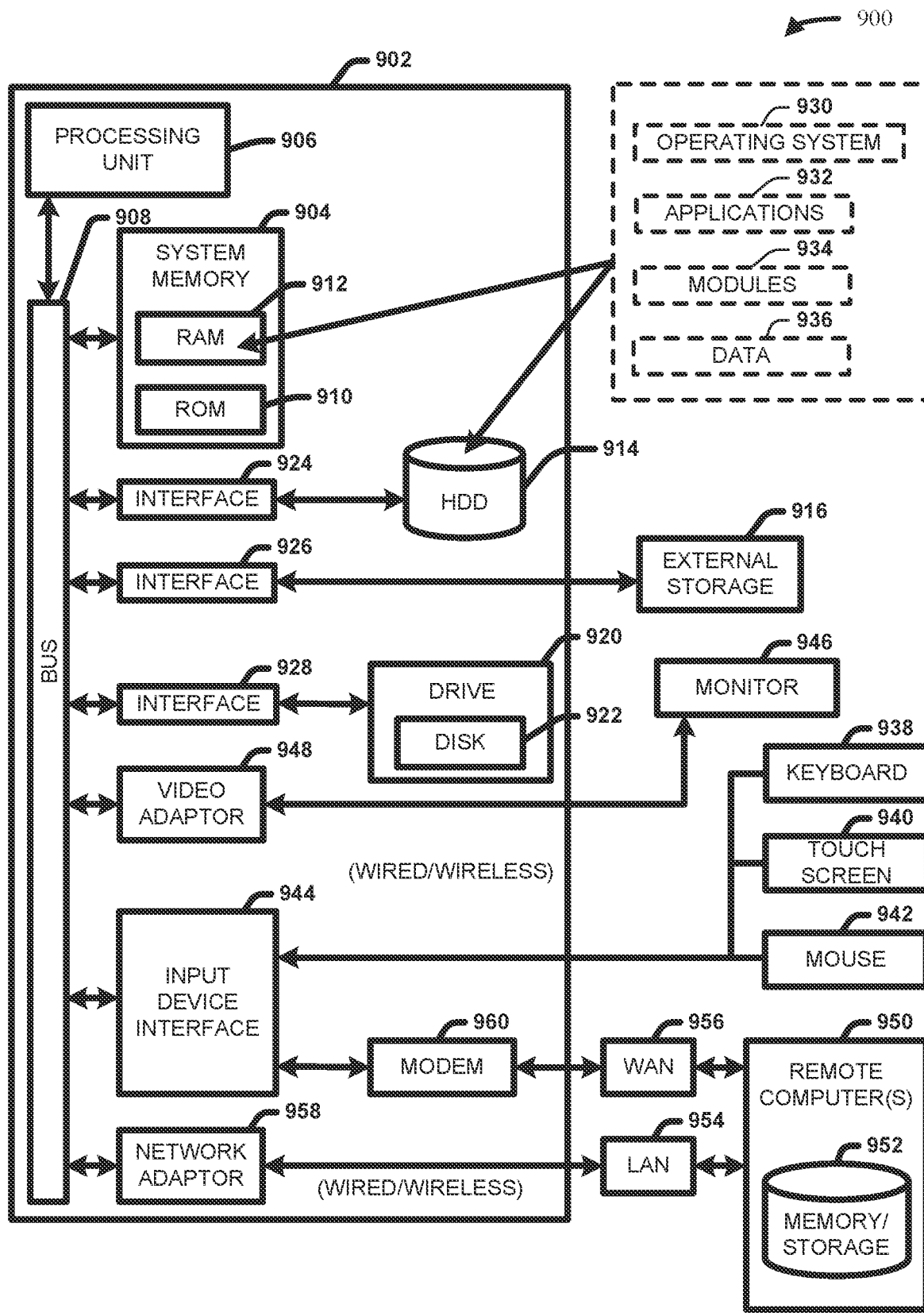
FIG. 9 illustrates a block diagram of an example, non-limiting operating environment in which one or more embodiments described herein can be facilitated.
Figure 10:
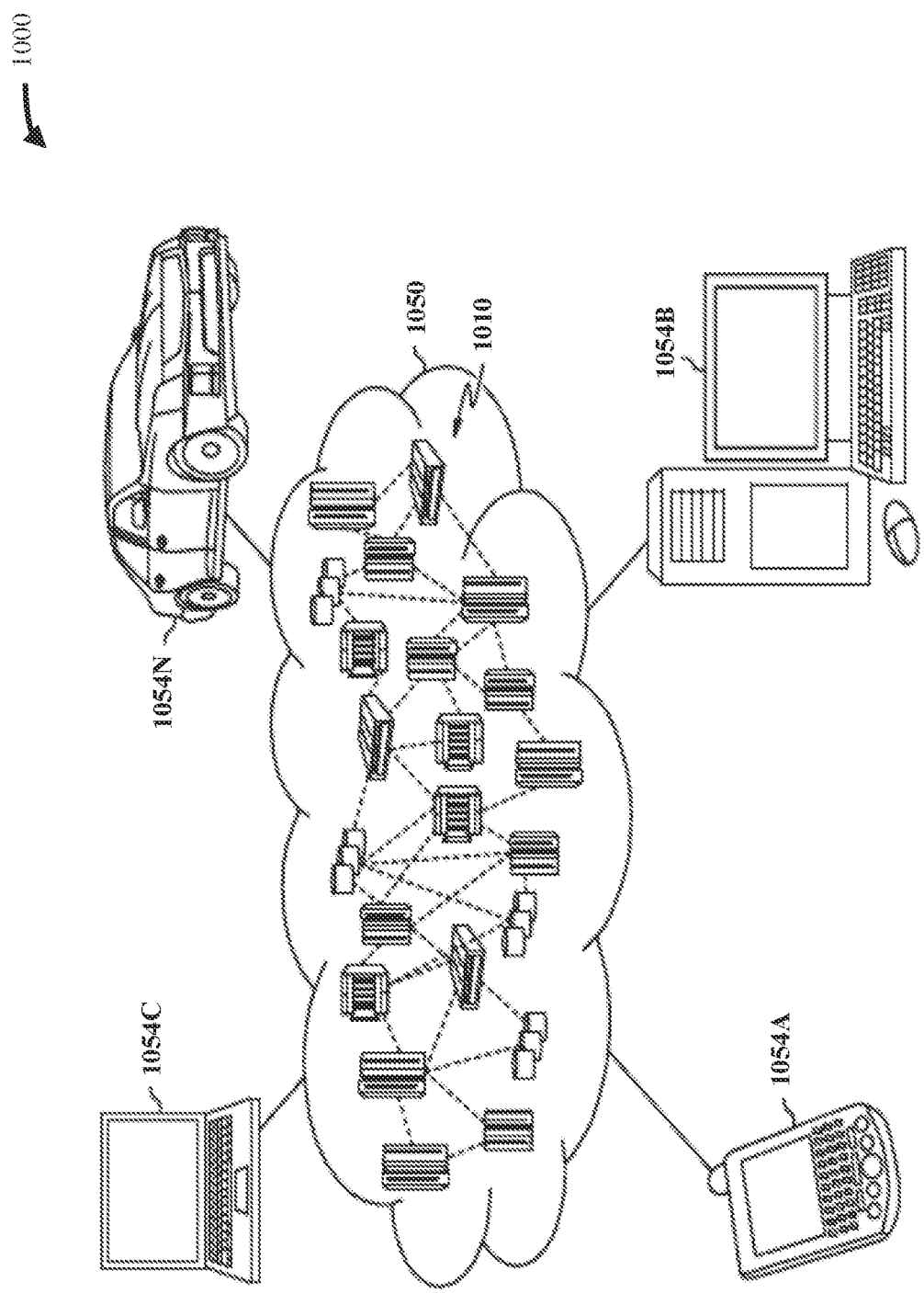
FIG. 10 illustrates a block diagram of an example, non-limiting cloud computing environment in accordance with one or more embodiments described herein.
Figure 11:
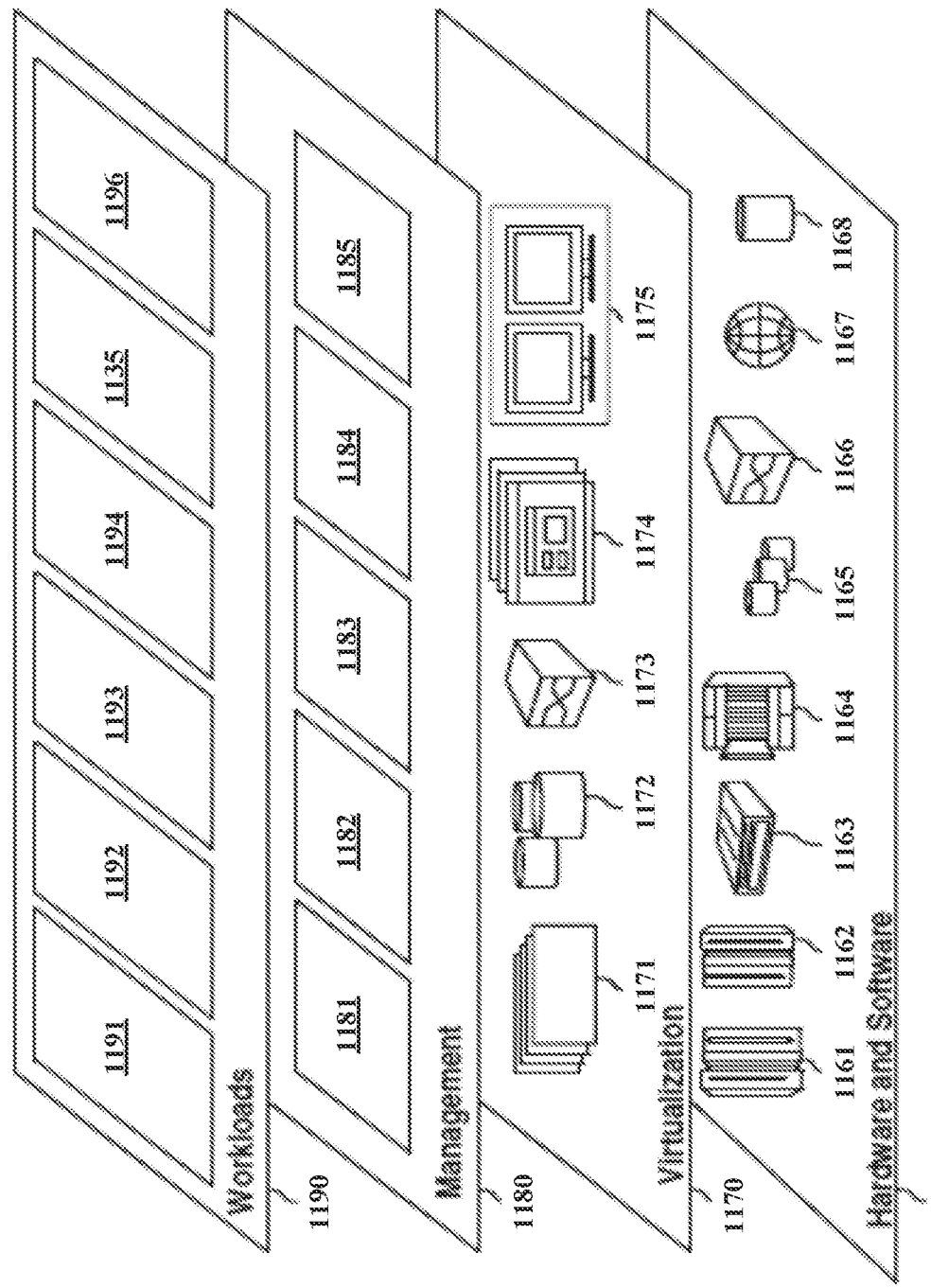
FIG. 11 illustrates a block diagram of a plurality of example, non-limiting abstraction model layers, in accordance with one or more embodiments described herein.

Turning next to FIGS. 9-11, a detailed description is provided of additional context for the one or more embodiments described herein at FIGS. 1-8.

FIG. 9 and the following discussion are intended to provide a brief, general description of a suitable operating environment 900 in which one or more embodiments described herein at FIGS. 1-8 can be implemented. For example, one or more components and/or other values of embodiments described herein can be implemented in or be associated with, such as accessible via, the operating environment 900. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 9, the example operating environment 900 for implementing one or more embodiments of the values described herein can include a computer 902, the computer 902 including a processing unit 906, a system memory 904 and/or a system bus 908. It will be appreciated that one or more values of the system memory 904 or processing unit 906 can be applied to memories such as 504 and/or to processors such as 506, respectively of the non-limiting system 500. It also will be appreciated that the system memory 904 can be implemented in combination with and/or alternatively to memories such as 504. Likewise, it also will be appreciated that the processing unit 906 can be implemented in combination with and/or alternatively to processors such as 506.

Memory 904 can store one or more computer and/or machine readable, writable and/or executable components and/or instructions that, when executed by processing unit 906 (e.g., a classical processor, a quantum processor and/or like processor), can facilitate performance of operations defined by the executable component(s) and/or instruction(s). For example, memory 904 can store computer and/or machine readable, writable and/or executable components and/or instructions that, when executed by processing unit 906, can facilitate execution of the one or more functions described herein relating to non-limiting system 500 and/or process optimization systems such as 502, as described herein with or without reference to the one or more figures of the one or more embodiments.

Memory 904 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 906 can comprise one or more types of processors and/or electronic circuitry (e.g., a classical processor, a quantum processor and/or like processor) that can implement one or more computer and/or machine readable, writable and/or executable components and/or instructions that can be stored at memory 904. For example, processing unit 906 can perform one or more operations that can be specified by computer and/or machine readable, writable and/or executable components and/or instructions including, but not limited to, logic, control, input/output (I/O), arithmetic and/or the like. In one or more embodiments, processing unit 906 can be any of one or more commercially available processors. In one or more embodiments, processing unit 906 can comprise one or more central processing unit, multi-core processor, microprocessor, dual microprocessors, microcontroller, System on a Chip (SOC), array processor, vector processor, quantum processor and/or another type of processor. The examples of processing unit 906 can be employed to implement one or more embodiments described herein.

The system bus 908 can couple system components including, but not limited to, the system memory 904 to the processing unit 906. The system bus 908 can comprise one or more types of bus structure that can further interconnect to a memory bus (with or without a memory controller), a peripheral bus and/or a local bus using one or more of a variety of commercially available bus architectures. The system memory 904 can include ROM 910 and/or RAM 912. A basic input/output system (BIOS) can be stored in a non-volatile memory such as ROM, erasable programmable read only memory (EPROM) and/or EEPROM, which BIOS contains the basic routines that help to transfer information among elements within the computer 902, such as during startup. The RAM 912 can include a high-speed RAM, such as static RAM for caching data.

The computer 902 can include an internal hard disk drive (HDD) 914 (e.g., EIDE, SATA), one or more external storage devices 916 (e.g., a magnetic floppy disk drive (FDD), a memory stick or flash drive reader, a memory card reader and/or the like) and/or a drive 920, e.g., such as a solid state drive or an optical disk drive, which can read or write from a disk 922, such as a CD-ROM disc, a DVD, a BD and/or the like. Additionally, and/or alternatively, where a solid state drive is involved, disk 922 could not be included, unless separate. While the internal HDD 914 is illustrated as located within the computer 902, the internal HDD 914 can also be configured for external use in a suitable chassis (not shown). Additionally, while not shown in operating environment 900, a solid state drive (SSD) can be used in addition to, or in place of, an HDD 914. The HDD 914, external storage device(s) 916 and drive 920 can be connected to the system bus 908 by an HDD interface 924, an external storage interface 926 and a drive interface 928, respectively. The HDD interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 912, including an operating system 930, one or more applications 932, other program modules 934 and/or program data 936. All or portions of the operating system, applications, modules and/or data can also be cached in the RAM 912. The systems and/or methods described herein can be implemented utilizing one or more commercially available operating systems and/or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In a related embodiment, operating system 930 can comprise one virtual machine (VM) of multiple VMs hosted at computer 902. Furthermore, operating system 930 can provide runtime environments, such as the JAVA runtime environment or the .NET framework, for applications 932. Runtime environments are consistent execution environments that can allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and/or settings for an application.

Further, computer 902 can be enabled with a security module, such as a trusted processing module (TPM). For instance, with a TPM, boot components hash next in time boot components and wait for a match of results to secured values before loading a next boot component. This process can take place at any layer in the code execution stack of computer 902, e.g., applied at application execution level and/or at operating system (OS) kernel level, thereby enabling security at any level of code execution.

An entity can enter and/or transmit commands and/or information into the computer 902 through one or more wired/wireless input devices, e.g., a keyboard 938, a touch screen 940 and/or a pointing device, such as a mouse 942. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 906 through an input device interface 944 that can be coupled to the system bus 908, but can be connected by other interfaces, such as a parallel port, an IEEE 1394 serial port, a game port, a USB port, an IR interface, a BLUETOOTH® interface and/or the like.

A monitor 946 or other type of display device can be alternatively and/or additionally connected to the system bus 908 via an interface, such as a video adapter 948. In addition to the monitor 946, a computer typically includes other peripheral output devices (not shown), such as speakers, printers and/or the like.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device and/or other common network node, and typically includes many or all of the elements described relative to the computer 902, although, for purposes of brevity, only a memory/storage device 952 is illustrated. Additionally, and/or alternatively, the computer 902 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 954 and/or larger networks, e.g., a wide area network (WAN) 956. LAN and WAN networking environments can be commonplace in offices and companies and can facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired and/or wireless communication to the LAN 954, which can also include a wireless access point (AP) disposed thereon for communicating with the adapter 958 in a wireless mode.

When used in a WAN networking environment, the computer 902 can include a modem 960 and/or can be connected to a communications server on the WAN 956 via other means for establishing communications over the WAN 956, such as by way of the Internet. The modem 960, which can be internal and/or external and a wired and/or wireless device, can be connected to the system bus 908 via the input device interface 944. In a networked environment, program modules depicted relative to the computer 902 or portions thereof can be stored in the remote memory/storage device 952. It will be appreciated that the network connections shown are merely exemplary and one or more other means of establishing a communications link among the computers can be used.

When used in either a LAN or WAN networking environment, the computer 902 can access cloud storage systems or other network-based storage systems in addition to, and/or in place of, external storage devices 916 as described above, such as but not limited to, a network virtual machine providing one or more values of storage and/or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, such as with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be practiced in distributed computing environments (e.g., cloud computing environments), such as described below with respect to FIG. 15, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1050 described below with reference to FIG. 10, and/or with reference to the one or more functional abstraction layers (e.g., quantum software and/or the like) described below with reference to FIG. 11, to execute one or more operations in accordance with one or more embodiments described herein. For example, cloud computing environment 1050 and/or one or more of the functional abstraction layers 1160, 1170, 1180 and/or 1190 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 500 and/or the example operating environment 900 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 500 and/or example operating environment 900 can be employed to use hardware and/or software to solve problems that are highly technical in nature, that are not abstract and/or that cannot be performed as a set of mental acts by a human.

Referring now to details of one or more elements illustrated at FIG. 10, the illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C and/or automobile computer system 1054N can communicate. Although not illustrated in FIG. 10, cloud computing nodes 1010 can further comprise a quantum platform (e.g., quantum computer, quantum hardware, quantum software and/or the like) with which local computing devices used by cloud consumers can communicate. Cloud computing nodes 1010 can communicate with one another. They can be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that cloud computing nodes 1010 and cloud computing environment 1050 can communicate with any type of computerized device over any type of network and/or network addressable connection (e.g., using a web browser).

Referring now to details of one or more elements illustrated at FIG. 11, a set 1100 of functional abstraction layers is shown, such as provided by cloud computing environment 1050 (FIG. 10). One or more embodiments described herein can be associated with, such as accessible via, one or more functional abstraction layers described below with reference to FIG. 11 (e.g., hardware and software layer 1160, virtualization layer 1170, management layer 1180 and/or workloads layer 1190). It should be understood in advance that the components, layers and/or functions shown in FIG. 11 are intended to be illustrative only and embodiments described herein are not limited thereto. As depicted, the following layers and/or corresponding functions are provided:

Hardware and software layer 1160 can include hardware and software components. Examples of hardware components include: mainframes 1161; RISC (Reduced Instruction Set Computer) architecture-based servers 1162; servers 1163; blade servers 1164; storage devices 1165; and/or networks and/or networking components 1166. In one or more embodiments, software components can include network application server software 1167, quantum platform routing software 1168; and/or quantum software (not illustrated in FIG. 11).

Virtualization layer 1170 can provide an abstraction layer from which the following examples of virtual entities can be provided: virtual servers 1171; virtual storage 1172; virtual networks 1173, including virtual private networks; virtual applications and/or operating systems 1174; and/or virtual clients 1175.

In one example, management layer 1180 can provide the functions described below. Resource provisioning 1181 can provide dynamic procurement of computing resources and other resources that can be utilized to perform tasks within the cloud computing environment. Metering and Pricing 1182 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1183 can provide access to the cloud computing environment for consumers and system administrators. Service level management 1184 can provide cloud computing resource allocation and/or management such that required service levels are met. Service Level Agreement (SLA) planning and fulfillment 1185 can provide pre-arrangement for, and procurement of, cloud computing resources for which a future requirement is anticipated in accordance with an SLA.

Workloads layer 1190 can provide examples of functionality for which the cloud computing environment can be utilized. Non-limiting examples of workloads and functions which can be provided from this layer include: mapping and navigation 1191; software development and lifecycle management 1192; virtual classroom education delivery 1193; data analytics processing 1194; transaction processing 1195; and/or application transformation software 1196.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out one or more aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

One or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an embodiment, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a sensor that senses and determines run-time multivariate sensor data from a manufacturing process;
   a memory that stores computer executable components; and
   a processor that executes the computer executable components stored in the memory, wherein the computer executable components comprise:
      an initialization component that identifies values of input data of one or more inputs of a set of inputs to the manufacturing process as control variables;
      a computation optimization component that:
         optimizes one or more intermediate flows, outflows or flow qualities of the manufacturing process using, for mode-specific regression models, decision variables that are based on a set of joint-levels of the control variables, wherein a joint-level of the set of joint-levels is a defined combination of values for one or more key flow rates of the system; and
         learns the mode-specific regression models from the sensor data to and captures relevant input-output predictive relationships based on the run-time multivariate sensor data, wherein the learning the mode-specific regression models comprises:
            learning a first linear regression model for post-processing and learning a second linear regression model for optimization; and
      an operation mode determination component that determines operation modes of the manufacturing process, wherein the operation mode determination component determines the operation modes by employing the run-time multivariate sensor data from the manufacturing process, and wherein the operation modes are together defined by the set of joint-levels of the control variables, wherein the optimization performed by the computation optimization component uses the operation modes as the decision variables for the mode-specific regression models, and wherein the learning the first linear regression model for post-processing is based on optimization with a tank temperature balance and wherein an output of the second linear regression model is employed to perform optimization without tank temperature balance.

2. The system of claim 1, wherein the operation mode determination component generates the set of joint-levels of the control variables using a joint temporal smooth algorithm over the control variables, and wherein the operation mode determination component reduces a total number of joint-levels of the control variables of the set by applying a classification algorithm.

3. The system of claim 1, wherein the operation modes are based on at least one of one or more levels of operation in a continuous flow process relating to the set of joint-levels of control variables, one or more representations of joint dynamics of the set of control variables over a defined length of a time horizon, or one or more joint configurations of an uptime/downtime of a plurality of units comprising an input of the set of inputs.

4. The system of claim 1, further comprising:
   a model generation component that generates mode-specific regression models for the operation modes by employing the identified values as the control variables for the mode-specific regression models, and wherein the output of the second linear regression model is a temperature.

5. The system of claim 1, wherein the operation mode determination component further determines the operation modes by employing historical multivariate sensor data from the manufacturing process.

6. The system of claim 1, wherein the computation optimization component further converts an optimization problem addressed by the optimization component from a bilinear optimization problem to a linear optimization problem by using the operation modes and mode-specific regression models.

7. The system of claim 1, wherein the operation mode determination component further determines one or more operation sub-modes within the operation modes, which one or more operation sub-modes are based on a percentile of the distribution of the control variables of the set of joint-levels of the control variables within the operation modes.

8. The system of claim 1,
   wherein the operation mode determination component also determines a candidate set of operation modes in a form of joint-levels across the identified control variables; and the system further comprising:
   a model generation component that generates mode-specific regression models as functions to interconnect the control variables, non-control variables and target variables.

9. A computer-implemented method, comprising:
   sensing and determining, by a sensor of a system operatively coupled to a processor, run-time multivariate sensor data from a manufacturing process;
   identifying, by the system, values of input data of one or more inputs of a set of inputs to the manufacturing process as control variables;
   optimizing, by the system, one or more intermediate flows, outflows or flow qualities of the manufacturing process using, for mode-specific regression models, decision variables that are based on a set of joint-levels of the control variables, wherein a joint-level of the set of joint-levels is a defined combination of values for one or more key flow rates of the system;
   learning, by the system, the mode-specific regression models from the sensor data;
   capturing, by the system, relevant input-output predictive relationships based on the run-time multivariate sensor data, wherein the learning the mode-specific regression models comprises learning a first linear regression model for post-processing and learning a second linear regression model for optimization; and
   determining, by the system, operation modes of the manufacturing process, wherein the determining the operation modes is performed by employing the run-time multivariate sensor data from the manufacturing process, and wherein the operation modes are together defined by the set of joint-levels of the control variables, wherein the optimization performed by the computation optimization component uses the operation modes as the decision variables for the mode-specific regression models, and wherein the learning the first linear regression model for post-processing is based on optimization with a tank temperature balance and wherein an output of the second linear regression model is employed to perform optimization without tank temperature balance.

10. The computer-implemented method of claim 9, wherein the operation modes are together defined by the set of joint-levels of the control variables, and wherein the optimizing of the one or more intermediate flows, outflows or flow qualities uses the operation modes as part of the decision variables with the mode-specific regression models.

11. The computer-implemented method of claim 9, further comprising:
generating, by the system, the set of joint-levels of the control variables using a joint temporal smooth algorithm over the control variables; and
reducing, by the system, a number of joint-levels of the control variables of the set by applying a classification algorithm.

12. The computer-implemented method of claim 9, further comprising:
generating, by the system, mode-specific regression models for the operation modes by employing the identified values as the control variables for the mode-specific regression models.

13. The computer-implemented method of claim 9, further comprising:
determining, by the system, the operation modes by employing historical multivariate sensor data from the manufacturing process.

14. The computer-implemented method of claim 9, further comprising:
converting, by the system, an optimization problem from a bilinear optimization problem to a linear optimization problem by using the operation modes and mode-specific regression models.

15. A non-transitory computer readable storage medium having program instructions embodied therewith, the program instructions executable by a processor to cause the processor to:
sense and determine, by a sensor coupled to the processor, run-time multivariate sensor data from a manufacturing process;
identify, by the processor, values of input data of one or more inputs of a set of inputs to a manufacturing process as control variables;
optimize, by the processor, one or more intermediate flows, outflows or flow qualities of the manufacturing process using, for mode-specific regression models, decision variables that are based on a set of joint-levels of the control variables, wherein a joint-level of the set of joint-levels is a defined combination of values for one or more key flow rates of a system;
learn, by the processor, the mode-specific regression models from the sensor data from the sensor;
capture, by the processor, via the sensor, relevant input-output predictive relationships based on the run-time multivariate sensor data, wherein the learning of the mode-specific regression models comprises learning a first linear regression model for post-processing and learning a second linear regression model for optimization; and
determine, by the processor, operation modes of the manufacturing process, wherein the determination is performed by employing time multivariate sensor data from the manufacturing process, and wherein the operation modes are together defined by the set of joint-levels of the control variables, wherein the optimization performed by the computation optimization component uses the operation modes as the decision variables for the mode-specific regression models, and wherein the learning the first linear regression model for post-processing is based on optimization with a tank temperature balance and wherein an output of the second linear regression model is employed to perform optimization without tank temperature balance.

16. The non-transitory computer readable storage medium of claim 15,
wherein the operation modes are together defined by the set of joint-levels of the control variables, and wherein the optimizing of the one or more intermediate flows, outflows or flow qualities uses the operation modes as part of the decision variables with the mode-specific regression models.

17. The non-transitory computer readable storage medium of claim 15, wherein the program instructions are further executable by a processor to cause the processor to:
generate, by the processor, the set of joint-levels of the control variables using a joint temporal smooth algorithm over the control variables, and
reduce, by the processor, a number of joint-levels of the control variables of the set by applying a classification algorithm.

18. The non-transitory computer readable storage medium of claim 15, wherein the program instructions are further executable by a processor to cause the processor to:
generate, by the processor, mode-specific regression models for the operation modes by employing the identified values as the control variables for the mode-specific regression models.

19. The non-transitory computer readable storage medium of claim 15, wherein the program instructions are further executable by a processor to cause the processor to:
determine, by the processor, the mode by employing historical multivariate sensor data from the manufacturing process or run-time multivariate sensor data from the manufacturing process.

* * * * *